(12) United States Patent
Jiang et al.

(10) Patent No.: US 12,512,463 B2
(45) Date of Patent: Dec. 30, 2025

(54) ANODE MATERIAL, ELECTROCHEMICAL DEVICE AND ELECTRONIC DEVICE INCLUDING THE SAME

(71) Applicant: Ningde Amperex Technology Limited, Ningde (CN)

(72) Inventors: Daoyi Jiang, Ningde (CN); Zhihuan Chen, Ningde (CN); Hang Cui, Ningde (CN); Yuansen Xie, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 843 days.

(21) Appl. No.: 17/585,976

(22) Filed: Jan. 27, 2022

(65) Prior Publication Data
US 2022/0158176 A1    May 19, 2022

Related U.S. Application Data

(63) Continuation of application No. PCT/CN2020/082576, filed on Mar. 31, 2020.

(30) Foreign Application Priority Data

Aug. 7, 2019   (CN) .......................... 201910725660.9

(51) Int. Cl.
*H01M 4/36* (2006.01)
*H01M 4/485* (2010.01)
(Continued)

(52) U.S. Cl.
CPC ........... *H01M 4/366* (2013.01); *H01M 4/485* (2013.01); *H01M 4/602* (2013.01); *H01M 4/62* (2013.01);
(Continued)

(58) Field of Classification Search
CPC ...... H01M 4/366; H01M 4/485; H01M 4/602; H01M 4/62; H01M 10/0525;
(Continued)

(56) References Cited

U.S. PATENT DOCUMENTS

2012/0321945 A1\*  12/2012  Park .................... H01M 4/1393
                                                                   977/734
2015/0010826 A1    1/2015  Wietelmann et al.
(Continued)

FOREIGN PATENT DOCUMENTS

CN         1854174 A      11/2006
CN         1939878 A       4/2007
(Continued)

OTHER PUBLICATIONS

International Search Report for International Application PCT/CN2020/082576 mailed May 27, 2020.
(Continued)

*Primary Examiner* — Michael Y Sun
(74) *Attorney, Agent, or Firm* — XSENSUS LLP (57) ABSTRACT

An anode material includes a lithiated silicon oxide material, an inorganic coating layer, and a polymer coating layer, wherein the inorganic coating layer and the lithiated silicon oxide material at least have Si—O-M bonds therebetween, and M includes at least one of an aluminum element, a boron element, and a phosphorus element. The anode material has high water stability, high first coulombic efficiency, and good cycle stability.

18 Claims, 5 Drawing Sheets

(51) Int. Cl.
  *H01M 4/60* (2006.01)
  *H01M 4/62* (2006.01)
  *H01M 10/0525* (2010.01)
  *H01M 4/02* (2006.01)
(52) U.S. Cl.
  CPC .. *H01M 10/0525* (2013.01); *H01M 2004/021* (2013.01); *H01M 2004/027* (2013.01)
(58) Field of Classification Search
  CPC ..... H01M 2004/021; H01M 2004/027; H01M 4/5825; H01M 4/134; H01M 4/136; H01M 4/362; H01M 4/386; H01M 4/628; Y02E 60/10; B82Y 30/00
  See application file for complete search history.

(56) References Cited

U.S. PATENT DOCUMENTS

| | | | | |
|---|---|---|---|---|
| 2017/0271723 | A1* | 9/2017 | Huang | H01M 10/0525 |
| 2019/0214637 | A1* | 7/2019 | Hirose | H01M 4/587 |
| 2021/0288316 | A1 | 9/2021 | Sha et al. | |

FOREIGN PATENT DOCUMENTS

| | | | |
|---|---|---|---|
| CN | 101047234 | A | 10/2007 |
| CN | 101778894 | A | 7/2010 |
| CN | 102122708 | A | 7/2011 |
| CN | 102471588 | A | 5/2012 |
| CN | 105280889 | A | 1/2016 |
| CN | 107195867 | A | 7/2017 |
| CN | 107112522 | A | 8/2017 |
| CN | 107799721 | A | 3/2018 |
| CN | 108701825 | A | 10/2018 |
| CN | 109075332 | A | 12/2018 |
| CN | 109103441 | A | 12/2018 |
| CN | 109638254 | A | 4/2019 |
| CN | 109755500 | A | 5/2019 |
| CN | 109841823 | A | 6/2019 |
| CN | 109888217 | A | 6/2019 |
| CN | 109923699 | A | 6/2019 |
| CN | 109950464 | A | 6/2019 |
| CN | 110444750 | A | 11/2019 |
| JP | 2014073942 | A | 4/2014 |
| JP | 2014082118 | A | 5/2014 |
| JP | 2016157652 | A | 9/2016 |
| JP | 2017152358 | A | 8/2017 |
| JP | 2019510353 | A | 4/2019 |
| WO | 2016194288 | A1 | 12/2016 |

OTHER PUBLICATIONS

Written Opinion for International Application PCT/CN2019/128857 mailed PCT/CN2020/082576 mailed May 27, 2020.
OA1 for counterpart application 201910725660.9 mailed Jun. 23, 2020.
OA2 for counterpart application 201910725660.9 mailed Sep. 10, 2020.
OA3 for counterpart application 201910725660.9 mailed Dec. 7, 2020.
Rejection Decision for counterpart application 201910725660.9 mailed Jan. 28, 2021.
Hyejung, Kim et al.: "A Critical Size of Silicon Nano-Anodes for Lithium Rechargeable Batteries", Angewandte Chemie International Edition, vol. 49, No. 12 Mar. 10, 2010.
First Office Action, dated Apr. 8, 2022, corresponding to CN Application No. 20210804929.
Second Office Action, dated Sep. 15, 2022, corresponding to CN Application No. 20210804929.
Fourth Office Action, dated May 17, 2021, corresponding to CN Application No. 201910725660.9.
Notice of Reasons for Refusal, dated Nov. 8, 2022, corresponding to JP Application No. 2021-558874.
Decision to Grant a Patent, dated Apr. 18, 202, corresponding to JP Application No. 2021-558874.
Extended European Search Report, dated May 31, 2022, corresponding to EP Application No. 20850623.8.

* cited by examiner

ANODE MATERIAL, ELECTROCHEMICAL DEVICE AND ELECTRONIC DEVICE INCLUDING THE SAME

CROSS REFERENCE TO RELATED APPLICATIONS

The present application is a continuation of National Phase Application PCT/CN2020/082576 filed on Mar. 31, 2020, which claims the benefit of priority from the China Patent Application No. 201910725660.9 filed on 7 Aug. 2019, the disclosure of which is hereby incorporated by reference in its entirety.

BACKGROUND

1. Technical Field

The present application relates to the field of energy storage, particularly to an anode material and an electrochemical device and an electronic device including the same, and particularly to a lithium ion battery.

2. Description of the Related Art

Silicon oxide anode materials are most likely to be the anode material of next-generation lithium ion batteries due to their gram capacity of 1500 to 1800 mAh/g and relatively low volume expansion (<160%). However, the first coulombic efficiency, which is generally below 75%, is currently an important reason limiting its application. Pre-lithiation treatment of the silicon oxide anode material can increase the first coulombic efficiency of the lithium ion battery including the pre-lithiated silicon oxide anode material to 88% or more, and thus has been extensively studied in the industry. However, pre-lithiation may have a certain influence on the stability of the silicon oxide anode material, especially during the processing of an aqueous slurry, as the slurry is prone to generate gas and gel. The current solution is mainly modifying the surface of the material so as to improve water resistance stability of the pre-lithiated silicon oxide anode material. The main modification method is using some hardeners (such as metal salts, inorganic acid salts) or some lithium ion shielding agents to improve water resistance stability of the material surface. These methods can alleviate hydrolysis and the collapse of silicates to a certain extent, but still cannot solve the hydrolysis problem of the silicates fundamentally. Therefore, water resistance stability of the pre-lithiated silicon oxide material needs to be further improved.

SUMMARY

Embodiments of the present application provide an anode material and a method of preparing the same, in an attempt to solve at least one of the problems existing in the related art, at least to some extent. The embodiments of the present application also provide an anode including the anode material, an electrochemical device, and an electronic device.

In one embodiment, the present application provides an anode material including a lithiated silicon oxide material, an inorganic coating layer, and a polymer coating layer, wherein the inorganic coating layer and the lithiated silicon oxide material at least have Si—O-M bonds therebetween, and M includes at least one of an aluminum element, a boron element, and a phosphorus element.

In another embodiment, the present application provides an anode including the anode material according to an embodiment of the present application.

In another embodiment, the present application provides an electrochemical device including the anode according to an embodiment of the present application.

In another embodiment, the present application provides an electronic device including the electrochemical device according to an embodiment of the present application.

Additional aspects and advantages of the embodiments of the present application will be described or shown in the following description or interpreted by implementing the embodiments of the present application.

BRIEF DESCRIPTION OF THE DRAWINGS

The following will briefly illustrate the accompanying drawings. Drawings necessary to describe the embodiments of the present application or the prior art will be briefly illustrated so as to facilitate the description of the embodiments of the present application. Obviously, the accompanying drawings described below only show some embodiments of the present application. For those skilled in the art, the drawings of other embodiments can still be obtained according to the structures illustrated in the drawings without any creative effort.

DETAILED DESCRIPTION

The embodiments of the present application will be described in detail below. The embodiments of the present application should not be interpreted as limitations to the present application.

As used in the present application, the term "about" is used for describing and explaining minor variations. When being used in combination with an event or circumstance, the term may refer to an example in which the event or circumstance occurs precisely, and an example in which the event or circumstance occurs approximately. For example, when being used in combination with a value, the term may refer to a variation range of less than or equal to ±10% of the value, for example, less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

In addition, sometimes, a quantity, a ratio, and another value are presented in a range format in the present application. It should be appreciated that such range formats are for convenience and conciseness, and should be flexibly understood as including not only values explicitly specified to range constraints, but also all individual values or sub-ranges within the ranges, like explicitly specifying each value and each sub-range.

In the detailed description and the claims, a list of items connected by the term "one of" or similar terms may mean any of the listed items. For example, if items A and B are listed, then the phrase "one of A and B" means only A or only B. In another example, if items A, B, and C are listed, then the phrase "one of A, B and C" means only A; only B; or only C. Item A may include a single component or multiple components. Item B may include a single component or multiple components. Item C may include a single component or multiple components.

In the detailed description and the claims, a list of items connected by the term "at least one of" or similar terms may mean any combination of the listed items. For example, if items A and B are listed, then the phrase "at least one of A and B" means only A; only B; or A and B. In another example, if items A, B and C are listed, then the phrase "at least one of A, B and C" means only A; or only B; only C; A and B (excluding C); A and C (excluding B); B and C (excluding A); or all of A, B and C. Item A may include a single component or multiple components. Item B may include a single component or multiple components. Item C may include a single component or multiple components.

I. Anode Materials

Embodiments of the present application provide an anode material including a lithiated silicon oxide material, an inorganic coating layer, and a polymer coating layer, wherein the inorganic coating layer and the lithiated silicon oxide material at least have Si—O-M bonds therebetween, and M includes at least one of an aluminum element, a boron element, and a phosphorus element.

In some embodiments, the lithiated silicon oxide material includes at least one of $Li_2SiO_3$, $Li_6Si_2O_7$, $Li_2Si_2O_5$ and $Li_4SiO_4$.

In some embodiments, the inorganic coating layer includes a compound including at least one of a phosphorus element, an aluminum element, and a boron element.

In some embodiments, the phosphorus element-containing compound is derived from at least one of phosphoric acid, triphosphoric acid, sodium tripolyphosphate, and potassium tripolyphosphate.

In some embodiments, the aluminum element-containing compound is derived from one or more of sodium metaaluminate, metaaluminate, aluminum trichloride, and aluminum hydroxide.

In some embodiments, the boron element-containing compound is derived from one or more of boric acid, sodium tetraborate or a hydrate thereof, potassium tetraborate or a hydrate thereof, sodium metaborate or a hydrate thereof, and potassium metaborate or a hydrate thereof.

In some embodiments, the compound containing any combination of the phosphorus element, the aluminum element, and the boron element is derived from one or more of aluminum dihydrogen tripolyphosphate, aluminum phosphate, aluminum borate, and aluminum tetrahydroborate.

In some embodiments, the weight percentage of M is about 0.05 wt % to 1.0 wt %, based on the total weight of the anode material. In some embodiments, the weight percentage of M is about 0.05 wt % to 0.9 wt %, based on the total weight of the anode material. In some embodiments, the weight percentage of M is about 0.06 wt %, about 0.07 wt %, about 0.08 wt %, about 0.1 wt %, about 0.2 wt %, about 0.4 wt %, about 0.6 wt %, or about 0.8 wt %, based on the total weight of the anode material.

In some embodiments, the anode active material has an X-ray diffraction peak having a 2θ value of about 21.7±1°.

In some embodiments, the polymer coating layer includes a hydrophobic polymer.

In some embodiments, the polymer coating layer includes at least one of the following compounds: polyimide, polyamideimide, polysiloxane, polymerized styrene butadiene rubber, epoxy resin, polyester resin and polyurethane resin.

In some embodiments, the weight percentage of the polymer coating layer is about 0.1 wt % to 10 wt %, based on the total weight of the anode material. In some embodiments, the weight percentage of the polymer coating layer is about 0.5 wt % to 9 wt %, based on the total weight of the anode material. In some embodiments, the weight percentage of the polymer coating layer is about 1 wt % to 8 wt %, based on the total weight of the anode material. In some embodiments, the weight percentage of the polymer coating layer is about 2 wt % to 7 wt %, based on the total weight of the anode material. In some embodiments, the weight percentage of the polymer coating layer is about 3 wt % to 5 wt %, based on the total weight of the anode material.

In some embodiments, the thickness of the polymer coating layer is about 5 nm to 200 nm. In some embodiments, the thickness of the polymer coating layer is about 10 nm to 150 nm. In some embodiments, the thickness of the polymer coating layer is about 20 nm to 100 nm. In some embodiments, the thickness of the polymer coating layer is about 30 nm to 80 nm.

In some embodiments, the lithiated silicon oxide material includes nano silicon crystal grains having a grain size of not more than about 10 nm. In some embodiments, the nano silicon crystal grains have a grain size of not more than about 8 nm. In some embodiments, the nano silicon crystal grains have a grain size of not more than about 5 nm.

Figure 1:
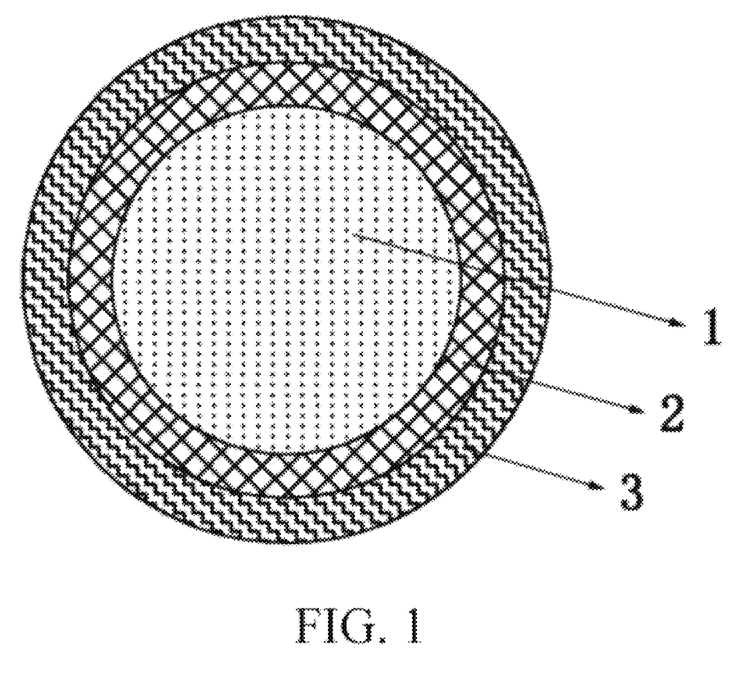
FIG. 1 shows a schematic structure diagram of an anode material of one embodiment of the present application.

FIG. 1 is a schematic structure diagram of an anode material of one embodiment of the present application. An inner layer 1 is a lithiated silicon oxide material, an intermediate layer 2 is an inorganic coating layer, and an outer layer 3 is a polymer coating layer.

II. Preparation Method of Anode Materials

Embodiments of the present application provide a method for preparing any one of the anode materials above, including:

(1) adding a pre-lithiated silicon oxide material and an inorganic coating material to a solvent to form a suspension liquid, and filtering and drying the suspension liquid to obtain a pre-lithiated silicon oxide material of which the surface is coated with an inorganic coating layer; and (2) adding the above prepared pre-lithiated silicon oxide material of which the surface is coated with the inorganic coating layer and a polymer to a solvent to form a mixed solution, removing the solvent, and heating at about 50 to 300° C. for about 4 to 12 h to obtain an anode material.

In some embodiments, the inorganic coating material includes at least one of the following materials: phosphoric acid, tripolyphosphoric acid, sodium tripolyphosphate, potassium tripolyphosphate, sodium metaaluminate, potassium metaaluminate, aluminum trichloride, aluminum hydroxide, boric acid, sodium tetraborate or a hydrate thereof, potassium tetraborate or a hydrate thereof, sodium metaborate or a hydrate thereof, potassium metaborate or a hydrate thereof, aluminum dihydrogen tripolyphosphate, aluminum phosphate, aluminum borate and aluminum tetrahydroborate.

In some embodiments, the solvent includes at least one of the following compounds: ethanol, toluene, xylene, N-methyl pyrrolidone, tetrahydrofuran, acetone, dimethylformamide, dimethylacetamide, dimethyl ether and butanol.

In some embodiments, the drying temperature is about 50 to 100° C. In some embodiments, the drying temperature is about 60 to 90° C. In some embodiments, the drying temperature is about 70° C. or about 80° C.

In some embodiments, the polymer includes a hydrophobic polymer. In some embodiments, the polymer includes at least one of the following compounds: polyimide, polyamideimide, polysiloxane, polymerized styrene butadiene rubber, epoxy resin, polyester resin and polyurethane resin.

In some embodiments, the heating temperature is about 100 to 250° C. In some embodiments, the heating temperature is about 80 to 200° C. In some embodiments, the heating temperature is about 150 to 200° C.

In some embodiments, the heating time is about 5 to 10 h. In some embodiments, the heating time is about 6 h, about 7 h, about 8 h or about 9 h.

Silicon oxide materials are materials with good cycle stability (capacity retention rate of 80% or more after more than 500 cycles), high capacity (1500 to 1800 mAh/g), and low cycle expansion (less than 160% volume expansion), and are suitable to be used as a material of the anode active material of lithium ion batteries.

However, silicon oxide materials have high irreversible capacity, making their first coulombic efficiency generally less than 75%, which has become the biggest obstacle to the application of the silicon oxide materials. By pre-lithiation of the silicon oxide material, the first coulombic efficiency can be greatly improved, and the first coulombic efficiency can reach 90% or higher by optimizing the pre-lithiated amount.

At present, in preparation of the anode, water is used as a solvent to disperse the anode active material in consideration of environmental protection, cost, and safety. In order to obtain a good dispersion effect, means such as high-strength kneading or high-speed dispersion are usually used during processing, which inevitably destroys materials having low water resistance stability. The buffer phase in the pre-lithiated silicon oxide material is typically composed of a mixture of a series of silicates (e.g., $Li_2SiO_3$, $Li_6Si_2O_7$, $Li_2Si_2O_5$ and $Li_4SiO_4$). These silicates have low water resistance stability and may hydrolyze and polymerize in aqueous solution systems to produce a series of silicon oxide clusters. These silicon oxide clusters are highly susceptible to acid-base fluctuations in the slurry systems, and thus further polymerize, which results in gelation.

On the other hand, in preparation of the anode, water is usually used as a solvent to prepare a slurry. In the process of preparing the slurry, a material is wetted by a binder or a dispersing agent by the action of a high-speed shearing force, which seriously damages the overall structure of the anode active material. The high-reactive silicon nanoparticles of the silicon oxide material in the anode active material are exposed, so that the silicon oxide material more easily contacts with water and generates hydrogen gas, which seriously reduces capacity and cycle stability of the silicon oxide material. Moreover, when the aqueous slurry of the anode active material is prepared on a large scale, the generated hydrogen gas may seriously affect storage stability and safety of the aqueous slurry.

In order to overcome the aforementioned problems, the present application provides an anode active material with high water resistance so as to meet the needs of conventional aqueous processing technology. First, an inorganic coating material is used to hydrolyze on the surface of the silicon oxide material to form an M-O group (M includes at least one of an aluminum element, a boron element and a phosphorus element) which may bond with the surface of the silicon oxide material more easily. The M-O group and a silanol group on the surface of the silicon oxide material further uses dehydration polymerize to form a tight coating layer of a network mainly composed of Si—O-M on the surface of the silicon oxide material. The hydrophobic polymer is then used for coating to form a water-insulation layer on the surface of the silicon oxide material, so that the overall structure has high water resistance stability. The anode active material of the present application can meet the needs of aqueous slurry processing in conventional anode fabrication. Further, the anode active material of the present application has high water resistance stability while can maintain a high first coulombic efficiency.

III. Anodes

Embodiments of the present application provide an anode. The anode includes a current collector and an anode active material layer on the current collector. The anode active material layer includes an anode material according to embodiments of the present application.

In some embodiments, the anode active material layer includes a binder. In some embodiments, the binder includes, but is not limited to, polyvinyl alcohol, carboxymethyl cellulose, hydroxypropyl cellulose, diacetyl cellulose, polyvinyl chloride, carboxylated polyvinyl chloride, polyvinyl fluoride, ethylene oxide containing polymers, polyvinylpyrrolidone, polyurethane, polytetrafluoroethylene, poly(1,1-difluoroethylene), polyethylene, polypropylene, styrene butadiene rubber, acrylated styrene butadiene rubber, epoxy resin, or nylon.

In some embodiments, the anode active material layer includes a conductive material. In some embodiments, the conductive material includes, but is not limited to, natural graphite, artificial graphite, carbon black, acetylene black, Ketjen black, carbon fiber, metal powder, metal fiber, copper, nickel, aluminum, silver, or polyphenylene derivatives.

In some embodiments, the current collector includes, but is not limited to, copper foil, nickel foil, stainless steel foil, titanium foil, nickel foam, copper foam, or a polymer substrate coated with a conductive metal.

In some embodiments, the anode may be obtained by mixing an active material, a conductive material, and a binder in a solvent to prepare an active material composition, and coating a current collector with the active material composition.

In some embodiments, the solvent may include, but is not limited to, N-methyl pyrrolidone.

IV. Cathodes

Materials, compositions, and preparation methods thereof that can be used in the embodiments of the present application include any of the techniques disclosed in the prior art. In some embodiments, the cathode is a cathode disclosed in U.S. Pat. No. 9,812,739B, which is incorporated into the present application by reference.

In some embodiments, the cathode includes a current collector and a cathode active material layer on the current collector.

In some embodiments, the cathode active material includes, but is not limited to, lithium cobalt oxides (Li- $CoO_2$), lithium nickel cobalt manganese (NCM) ternary material, lithium iron phosphate ($LiFePO_4$), or lithium manganate ($LiMn_2O_4$).

In some embodiments, the cathode active material layer further includes a binder, and optionally a conductive material. The binder improves the binding of the cathode active material particles to each other, and also improves the binding of the cathode active material to the current collector.

In some embodiments, the binder includes, but is not limited to, polyvinyl alcohol, hydroxypropyl cellulose, diacetyl cellulose, polyvinyl chloride, carboxylated polyvinyl chloride, polyvinyl fluoride, ethylene oxide containing polymers, polyvinylpyrrolidone, polyurethane, polytetrafluoroethylene, poly(1,1-difluoroethylene), polyethylene, polypropylene, styrene butadiene rubber, acrylated styrene butadiene rubber, epoxy resin, or nylon.

In some embodiments, the conductive material includes, but is not limited to, a carbon-based material, a metal-based material, a conductive polymer and a mixture thereof. In some embodiments, the carbon-based material is selected from natural graphite, artificial graphite, carbon black, acetylene black, Ketjen black, carbon fiber or any combination thereof. In some embodiments, the metal-based material is selected from metal powder, metal fibers, copper, nickel, aluminum, or silver. In some embodiments, the conductive polymer is a polyphenylene derivative.

In some embodiments, the current collector may include, but is not limited to, aluminum.

The cathode may be prepared by a preparation method known in the art. For example, the cathode may be obtained by mixing an active material, a conductive material, and a binder in a solvent to prepare an active material composition, and coating a current collector with the active material composition. In some embodiments, the solvent may include, but is not limited to, N-methyl pyrrolidone.

V. Electrolytic Solutions

The electrolytic solution which can be used in the embodiments of the present application can be an electrolytic solution known in the prior art.

In some embodiments, the electrolytic solution includes an organic solvent, a lithium salt, and an additive. The organic solvent used in the electrolytic solution according to the present application may be any organic solvent known in the art as a solvent for an electrolytic solution. The electrolyte used in the electrolytic solution according to the present application is not limited, and may be any electrolyte known in the art. The additive of the electrolytic solution according to the present application may be any additive known in the prior art which can be used as an additive of the electrolytic solution.

In some embodiments, the organic solvent includes, but is not limited to, ethylene carbonate (EC), propylene carbonate (PC), diethyl carbonate (DEC), ethyl methyl carbonate (EMC), dimethyl carbonate (DMC), propylene carbonate or ethyl propionate.

In some embodiments, the lithium salt includes at least one of organic lithium salt or inorganic lithium salt.

In some embodiments, the lithium salt includes, but is not limited to, lithium hexafluorophosphate ($LiPF_6$), lithium tetrafluoroborate ($LiBF_4$), lithium difluorophosphate ($LiPO_2F_2$), lithium bis(trifluoromethanesulphonyl)imide $LiN(CF_3SO_2)_2$ (LiTFSI), lithium bis(fluorosulfonyl)imide $Li(N(SO_2F)_2$ (LiFSI), lithium bis(oxalato)borate $LiB(C_2O_4)_2$ (LiBOB), or lithium difluoro(oxalato)borate $LiBF_2(C_2O_4)$ (LiDFOB).

In some embodiments, the concentration of the lithium salt in the electrolytic solution is about 0.5 to 3 mol/L, about 0.5 to 2 mol/L, or about 0.8 to 1.5 mol/L.

VI. Separators

In some embodiments, a separator is arranged between the cathode and the anode to prevent short circuits. The material and shape of the separator which may be used in the embodiments of the present application are not particularly limited, and can be any of the techniques disclosed in the prior art. In some embodiments, the separator includes a polymer or inorganic substance or the like formed of a material that is stable to the electrolytic solution of the present application.

For example, the separator may include a substrate layer and a treatment layer. The substrate layer is a nonwoven fabric, a film or a composite film having a porous structure, and the material of the substrate layer is at least one selected from polyethylene, polypropylene, polyethylene glycol terephthalate, and polyimide. Specifically, a polypropylene porous film, a polyethylene porous film, polypropylene nonwoven cloth, polyethylene nonwoven cloth or a polypropylene-polyethylene-polypropylene porous composite film may be adopted.

At least one surface of the substrate layer is provided with a surface treatment layer, which may be a polymer layer or an inorganic layer, or a layer formed by mixing a polymer and an inorganic substance.

The inorganic layer includes inorganic particles and a binder, and the inorganic particles are any one or combination of more than one selected from aluminum oxide, silicon oxide, magnesium oxide, titanium oxide, hafnium oxide, tin oxide, cerium oxide, nickel oxide, zinc oxide, calcium oxide, zirconium oxide, yttrium oxide, silicon carbide, boehmite, aluminum hydroxide, magnesium hydroxide, calcium hydroxide, and barium sulfate. The binder is any one or combination of more than one selected from polyvinylidene fluoride, vinylidene fluoride-hexafluoropropylene copolymer, polyamide, polyacrylonitrile, polyacrylate ester, polyacrylic acid, polyacrylate salt, polyvinylpyrrolidone, polyvinyl ether, polymethyl methacrylate, polytetrafluoroethylene, and polyhexafluoropropylene.

The polymer layer includes a polymer selected from at least one of polyamide, polyacrylonitrile, acrylate polymer, polyacrylic acid, polyacrylate salt, polyvinylpyrrolidone, polyvinyl ether, polyvinylidene fluoride or poly(vinylidene fluoride-hexafluoropropylene).

VII. Electrochemical Devices

Embodiments of the present application provide an electrochemical device that includes any device that undergoes an electrochemical reaction.

In some embodiments, the electrochemical device of the present application includes a cathode having a cathode active material capable of occluding and releasing metal ions, an anode according to embodiments of the present application, an electrolytic solution, and a separator arranged between the cathode and the anode.

In some embodiments, the electrochemical devices of the present application include, but are not limited to, all types of primary batteries, secondary batteries, fuel batteries, solar batteries, or capacitors.

In some embodiments, the electrochemical device is a lithium secondary battery.

In some embodiments, the lithium secondary battery includes, but is not limited to, a lithium metal secondary battery, a lithium ion secondary battery, a lithium polymer secondary battery, or a lithium ion polymer secondary battery.

VIII. Electronic Devices

The electronic device of the present application may be any device using an electrochemical device according to an embodiment of the present application.

In some embodiments, the electronic device include, but not limited to: a notebook computer, a pen-input computer, a mobile computer, an e-book player, a portable phone, a portable fax machine, a portable copier, a portable printer, a head-mounted stereo headphone, a video recorder, an LCD TV, a portable cleaner, a portable CD player, a Mini disc player, a transceiver, an electronic notebook, a calculator, a memory card, a portable recorder, a radio, a backup power source, a motor, a vehicle, a motorcycle, a motorized bicycle, a bicycle, a lighting apparatus, a toy, a game console, a clock, an electric tool, a flashing light, a camera, a large battery for household use, or a lithium ion capacitor.

Hereinafter, the lithium ion battery is exemplified as an example and the preparation of the lithium ion battery is described in conjunction with a specific embodiment. Those skilled in the art would understand that the preparation method described in the present application is merely an example, and any other suitable preparation methods fall within the scope of the present application.

EMBODIMENT

Embodiments of the lithium ion battery according to the present application and comparative examples for performance evaluation are described below.

I. Preparation of an Anode Active Material

The anode active materials of Embodiments 1 to 18 were prepared by the following method:
(1) A pre-lithiated silicon oxide material (C %=about 3.2%, Dv50=about 5.1 μm, silicon grain size is about 5 nm, a cushion phase of $Li_2SiO_3$) and an inorganic coating material were added to ethanol and stirred for about 0.5 to 4 h until a homogeneous suspension liquid was formed, the formed suspension liquid was filtered, and the filtered material was dried at about 80° C. for about 12 h to obtain a pre-lithiated silicon oxide material of which the surface was coated with an inorganic coating layer.
(2) The pre-lithiated silicon oxide material of which the surface was coated with the inorganic coating layer and a polymer were added to ethanol to form a suspension liquid, then the solvent was removed from the formed suspension liquid, and next, the filtered material was heated at about 150° C. for about 10 h to obtain the anode active material of the present application.

The preparation method of the anode active material in Comparative Example 1 was similar to the above preparation method except that the pre-lithiated silicon oxide material in Comparative Example 1 was not coated with an inorganic material, but was directly coated with a polymer.

The preparation method of the anode active material in Comparative Example 2 was similar to the above preparation method except that the pre-lithiated silicon oxide material in Comparative Example 2 was only coated with an inorganic material, but was not coated with a polymer.

The anode active material in Comparative Example 3 was a pre-lithiated silicon oxide material which was not coated with any material.

(2) Testing Method

1. Testing Method of Content of M Element in Anode Active Material

About 0.2 g of the anode active material was weighed and placed in a beaker of polytetrafluoroethylene (PTFE) material. After the measured value of the digital balance is stable, the weight of the sample was recorded, accurate to 0.0001 g. About 10 mL of concentrated $HNO_3$ and about 2 mL of HF were slowly added to the sample, the beaker was placed on a panel heater at about 220° C., and the solution was diluted by heating until the solution was almost evaporated. About 10 mL of nitric acid was slowly added, and the solution was continued to be diluted by heating for about 15 min to allow the sample to dissolve sufficiently. The dissolved sample was placed in a fume hood and cooled to room temperature. The sample solution was shaken well and slowly poured into a funnel using a single layer of filter paper, and the beaker and filter residue were rinsed 3 times. The filtrate was adjusted to a volume of about 50 mL at about 20±5° C. and shaken. The ion spectral intensity of the filtrate was tested by an inductively coupled plasma (ICP) emission spectrometer (PE 7000), and the ion concentration was calculated according to a standard curve to calculate the content of elements contained in the sample.

2. Testing Method for Content of Polymer Coating Layer in Anode Active Material

The content of the polymer coating layer in the anode active material may be tested by thermogravimetric analysis (TGA).

3. X-Ray Diffraction Characterization Method of Anode Active Material

The anode active material sample was placed in a circular pit having a diameter of about 1 cm, the surface was smoothed, and the sample was scanned by an X-ray spectrometer (D8 Advance, Cu target X light source), the tilt angle 2θ was from about 10° to about 85°, and the scanning frequency was 3°/min.

4. Evaluation Method of Settlement of Aqueous Slurry of Anode Active Material

For the anode active material obtained in the embodiments or the comparative examples, conductive carbon black and the binder PAA (modified polyacrylic acid) were added to deionized water at a weight ratio of about 80:10:10, and stirred to form an aqueous slurry. The aqueous slurry was stored for about 48 hours and the final viscosity of the aqueous slurry was measured. The final viscosity was compared to the initial viscosity, when the difference between the initial viscosity and the final viscosity was less than about 1000 Pa·s, the aqueous slurry was recorded as no settlement; when the difference between the initial viscosity and the final viscosity was about 1000 to 2000 Pa·s, the aqueous slurry was recorded as slight settlement; when the difference between the initial viscosity and the final viscosity was greater than about 2000 Pa·s, the aqueous slurry was recorded as heavy settlement.

5. Evaluation Method of Gelation of Aqueous Slurry of Anode Active Material

For the anode active material obtained in the embodiments or the comparative examples, conductive carbon black and the binder PAA (modified polyacrylic acid) were added to deionized water at a weight ratio of about 80:10:10, and stirred to form an aqueous slurry. The aqueous slurry was stored for about 48 hours and the particles at the lower layer of the aqueous slurry were tested by a dynamic light scattering method. When particles having a particle diameter of about 50 to 100 μm appeared in the aqueous slurry, the aqueous slurry was recorded as slight gelation; when particles having a particle diameter of more than about 100 to 1000 μm appeared in the aqueous slurry, the aqueous slurry was recorded as severe gelation.

6. Testing Method of Gas Production Amount of Aqueous Slurry of Anode Active Material For the anode active material obtained in the embodiments or the comparative examples, conductive carbon black and the binder PAA (modified polyacrylic acid) were added to deionized water at a weight ratio of about 80:10:10, and stirred to form an aqueous slurry. About 100 g of the aqueous slurry was sealed in a closed container of about 250 mL for about 48 hours. The proportion of hydrogen gas produced was tested by gas chromatography. According to the reaction principle, other gases in the system were substantially unchanged, and in the case where only hydrogen gas was produced, the gas production amount was characterized by the volume proportion of hydrogen gas in the entire mixed system.

7. Testing Method of a Button Battery:

In a dry argon atmosphere, a solvent was formed by mixing propylene carbonate (PC), ethylene carbonate (EC) and diethyl carbonate (DEC) (at a weight ratio of about 1:1:1), $LiPF_6$ was added to the solvent, and the mixture was mixed evenly, wherein the concentration of $LiPF_6$ was about 1.15 mol/L. Then, about 7.5 wt % fluoroethylene carbonate (FEC) was added and uniformly mixed to obtain an electrolytic solution.

For the anode active material obtained in the embodiments and the comparative examples, conductive carbon black and the binder PAA (modified polyacrylic acid) were added to deionized water at a weight ratio of 80:10:10, and stirred to form an aqueous slurry. A scraper was used for coating the aqueous slurry so as to form a coating having a thickness of about 100 μm, and the coating was dried in a vacuum drying oven at about for about 12 hours. In a dry environment, a punch was used for cutting to obtain a wafer having a diameter of about 1 cm, and a metal lithium plate was used as a counter electrode in a glove box. A Celgard composite film was used as the separator, and an electrolytic solution was added to assemble a button battery. The battery was tested using a LAND series battery test for charge and discharge testing. The first coulombic efficiency was the ratio of charge capacity to discharge capacity.

8. Cycle Performance Test of a Lithium Ion Battery (1) Preparation of a Lithium Ion Battery Preparation of Cathodes $LiCoO_2$, conductive carbon black and polyvinylidene fluoride (PVDF) were sufficiently stirred and uniformly mixed in an N-methyl pyrrolidone solvent system at a weight ratio of about 95%:2.5%:2.5% to prepare a cathode slurry. Aluminum foil as a cathode current collector was coated with the obtained cathode slurry, and drying and cold pressing were carried out to obtain the cathode.

Preparation of Anodes

Graphite, the anode active materials prepared according to Embodiments 1 to 18 and Comparative Examples 1 to 3, a conductive agent (conductive carbon black, Super P®), and the binder PAA were mixed at a weight ratio of about 70%:15%:5%:10%, an appropriate amount of water was added, and the mixture was kneaded at a solid content of about 55% to 70%. An appropriate amount of water was added to adjust the viscosity of the slurry to about 4000 to 6000 Pa·s to prepare an anode slurry.

Copper foil as an anode current collector was coated with the obtained anode slurry, and drying and cold pressing were carried out to obtain the anode.

Preparation of an Electrolytic Solution

In a dry argon atmosphere, a solvent was formed by mixing propylene carbonate (PC), ethylene carbonate (EC) and diethyl carbonate (DEC) (at a weight ratio of about 1:1:1), $LiPF_6$ was added to the mixture, and the mixture was mixed evenly, wherein the concentration of $LiPF_6$ was about 1.15 mol/L. Then, about 7.5 wt % fluoroethylene carbonate (FEC) was added and uniformly mixed to obtain the electrolytic solution.

Preparation of Separators

A PE porous polymer film was used as a separator.

Preparation of a Lithium Ion Battery

The cathode, the separator, and the anode were stacked in such an order so that the separator was placed between the cathode and the anode to isolate the anode and the cathode. A bare cell was obtained by winding. The bare cell was placed in an outer package, the electrolytic solution was injected, and the battery was packaged. A lithium ion battery was obtained through a process including formation, degassing, trimming, and the like.

(2) Cycle Performance Test:

At 25° C., a battery was charged to 4.4V with a constant current of 0.7 C, charged to 0.025 C at a constant voltage, and allowed to stand for 5 minutes. The battery was then discharged to 3.0 V at 0.5 C. The capacity obtained by the above steps was the initial capacity. A cycle test was carried out with 0.7 C charge/0.5 C discharge, and the ratio of the capacity of each step to the initial capacity was obtained. Small current recovery was carried out every 50 cycles (charging to 4.4 V at a 0.2 C constant current, charging to 0.025 C at a constant voltage, allowing to stand for 5 minutes for discharging to 3.0 V at 0.2 C), whereby a capacity decay curve was obtained.

The materials and amounts used in the embodiments and comparative examples and the test results are shown in Table 1.

TABLE 1

| No. | Pre-lithiated silicon oxide material (100 g) | Inorganic coating material | Polymer | First coulombic efficiency | ICP measurement element content (% by weight) | 48 h settlement | 48 h gelation | 48 h gas production (% by volume) |
|---|---|---|---|---|---|---|---|---|
| Embodiment 1 | C % = 3.2%\Dv50 = 5.1 μm\ Si grain 5 nm\Dispersion phase $Li_2SiO_3$ | 0.5 g of 85% phosphoric acid | 3 g of polyimide | 87.8% | 0.106% P | No settlement | No gelation | No $H_2$ |
| Embodiment 2 | C % = 3.2%\Dv50 = 5.1 μm\ Si grain 5 nm\Dispersion phase $Li_2SiO_3$ | 0.5 g of tripolyphosphoric acid | 3 g of polyimide | 87.6% | 0.146% P | No settlement | No gelation | 0.3% $H_2$ |
| Embodiment 3 | C % = 3.2%\Dv50 = 5.1 μm\ Si grain 5 nm\Dispersion phase $Li_2SiO_3$ | 0.75 g of sodium metaaluminate | 3 g of polyimide | 87.9% | 0.256% Al | No settlement | No gelation | 0.2% $H_2$ |

TABLE 1-continued

| No. | Pre-lithiated silicon oxide material (100 g) | Inorganic coating material | Polymer | First coulombic efficiency | ICP measurement element content (% by weight) | 48 h settlement | 48 h gelation | 48 h gas production (% by volume) |
|---|---|---|---|---|---|---|---|---|
| Embodiment 4 | C % = 3.2%\Dv50 = 5.1 μm\ Si grain 5 nm\Dispersion phase $Li_2SiO_3$ | 0.5 g of aluminum trichloride | 3 g of polyimide | 87.4% | 0.089% Al | No settlement | Slight gelation | 0.5% $H_2$ |
| Embodiment 5 | C % = 3.2%\Dv50 = 5.1 μm\ Si grain 5 nm\Dispersion phase $Li_2SiO_3$ | 1 g of boric acid | 3 g of polyimide | 88.2% | 0.116% B | No settlement | No gelation | 2% $H_2$ |
| Embodiment 6 | C % = 3.2%\Dv50 = 5.1 μm\ Si grain 5 nm\Dispersion phase $Li_2SiO_3$ | 2 g of sodium tetraborate | 3 g of polyimide | 87.5% | 0.246% B | No settlement | No gelation | No $H_2$ |
| Embodiment 7 | C % = 3.2%\Dv50 = 5.1 μm\ Si grain 5 nm\Dispersion phase $Li_2SiO_3$ | 0.65 g of aluminum hydroxide | 3 g of polyimide | 87.8% | 0.198% Al | No settlement | No gelation | No $H_2$ |
| Embodiment 8 | C % = 3.2%\Dv50 = 5.1 μm Si grain 5 nm\Dispersion phase $Li_2SiO_3$ | 0.75 g of sodium tripolyphosphate and 0.75 g of sodium metaaluminate | 3 g of polyimide | 88.3% | 0.116% P and 0.213% Al | No settlement | No gelation | No $H_2$ |
| Embodiment 9 | C % = 3.2%\Dv50 = 5.1 μm\ Si grain 5 nm\Dispersion phase $Li_2SiO_3$ | 0.5 g of boric acid and 0.6 g of tripolyphosphoric acid | 3 g of polyimide | 88.0% | 0.136% B and 0.153% P | Settlement | No gelation | 0.8% $H_2$ |
| Embodiment 10 | C % = 3.2%\Dv50-5.1 μm\ Si grain 5 nm Dispersion phase $Li_2SiO_3$ | 0.75 g of aluminum dihydrogen tripolyphosphate | 3 g of polyimide | 88.7% | 0.052% Al and 0.062% P | Settlement | No gelation | 0.8% $H_2$ |
| Embodiment 11 | C % = 3.2%\Dv50 = 5.1 μm\ Si grain 5 nm\Dispersion phase $Li_2SiO_3$ | 1.5 g of aluminum dihydrogen tripolyphosphate | 3 g of polyimide | 88.5% | 0.104% Al and 0.098% P | No settlement | No gelation | 0.4% $H_2$ |
| Embodiment 12 | C % = 3.2%\Dv50 = 5.1 μm\ Si grain 5 nm\Dispersion phase $Li_2SiO_3$ | 2 g of aluminum dihydrogen tripolyphosphate | 3 g of polyimide | 88.2% | 0.126% Al and 0.130% P | No settlement | No gelation | No $H_2$ |
| Embodiment 13 | C % = 3.2%\Dv50 = 5.1 μm\ Si grain 5 nm\Dispersion phase $Li_2SiO_3$ | 2 g of aluminum dihydrogen tripolyphosphate | 3 g of polysiloxane | 87.5% | 0.109% Al and 0.191% P | No settlement | No gelation | No $H_2$ |
| Embodiment 14 | C % = 3.2%\Dv50 = 5.1 μm\ Si grain 5 nm\Dispersion phase $Li_2SiO_3$ | 2 g of aluminum dihydrogen tripolyphosphate | 3 g of polymerized styrene butadiene rubber | 89.0% | 0.125% Al and 0.163% P | No settlement | No gelation | 1.5% $H_2$ |
| Embodiment 15 | C % = 3.2%\Dv50 = 5.1 μm\ Si grain 5 nm\Dispersion phase $Li_2SiO_3$ | 2 g of aluminum dihydrogen tripolyphosphate | 1.5 g of polyimide and 1 g of polymerized styrene butadiene rubber | 88.2% | 0.131% Al and 0.154% P | No settlement | Slight gelation | 3.% $H_2$ |
| Embodiment 16 | C % = 3.2%\Dv50 = 5.1 μm\ Si grain 5 nm\Dispersion phase $Li_2SiO_3$ | 2 g of aluminum dihydrogen tripolyphosphate | 1.5 g of polyamide-imide and 1 g polysiloxane | 88.3% | 0.118% Al and 0.202% P | No settlement | No gelation | 2.2% $H_2$ |
| Embodiment 17 | C % = 3.2%\Dv50 = 5.1 μm\ Si grain 5 nm\Dispersion phase $Li_2SiO_3$ | 2 g of aluminum dihydrogen tripolyphosphate | 1 g of polyimide | 88.5% | 0.130% Al and 0.228% P | No settlement | Slight gelation | 2.1% $H_2$ |
| Embodiment 18 | C % = 3.2%\Dv50 = 5.1 μm\ Si grain 5 nm\Dispersion phase $Li_2SiO_3$ | 2 g of aluminum dihydrogen tripolyphosphate | 5 g of polyimide | 85.6% | 0.123% Al and 0.110% P | No settlement | No gelation | No $H_2$ |
| Comparative Example 1 | C % = 3.2%\Dv50 = 5.1 μm\ Si grain 5 nm\Dispersion phase $Li_2SiO_3$ | — | 3 g of polyimide | 88.9% | — | Slight settlement | Slight gelation | 10.2% $H_2$ |
| Comparative Example 2 | C % = 3.2%\Dv50 = 5.1 μm\ Si grain 5 nm\Dispersion phase $Li_2SiO_3$ | 2 g of aluminum dihydrogen tripolyphosphate | — | 88.7% | 0.142% Al and 0.138% P | Slight settlement | Slight gelation | 13.6% $H_2$ |
| Comparative Example 3 | C % = 3.2%\Dv50 = 5.1 μm\ Si grain 5 nm\Dispersion phase $Li_2SiO_3$ | — | — | 89.8% | — | heavy settlement | Severe gelation | 76.0% $H_2$ |

"—" indicates absence of such substance

Figure 2A:
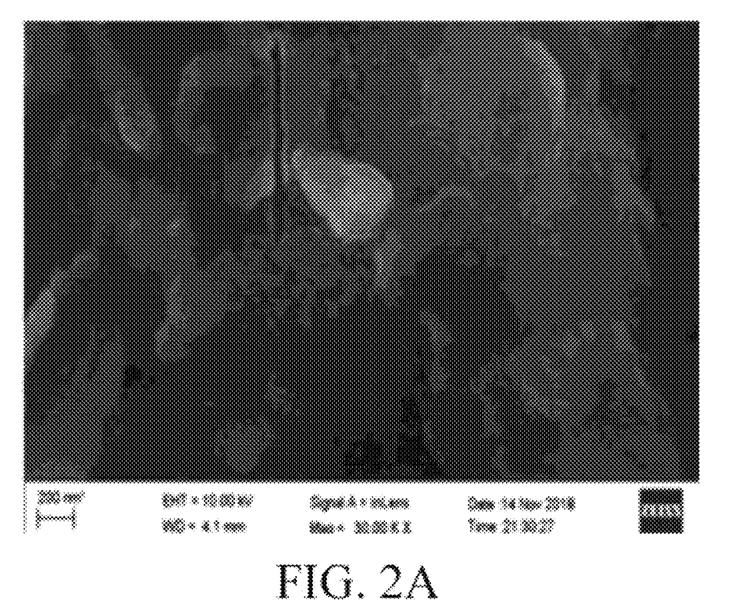
FIG. 2A shows a scanning electron microscope (SEM) image of the surface of an anode material of Comparative Example 3 of the present application.
Figure 2B:
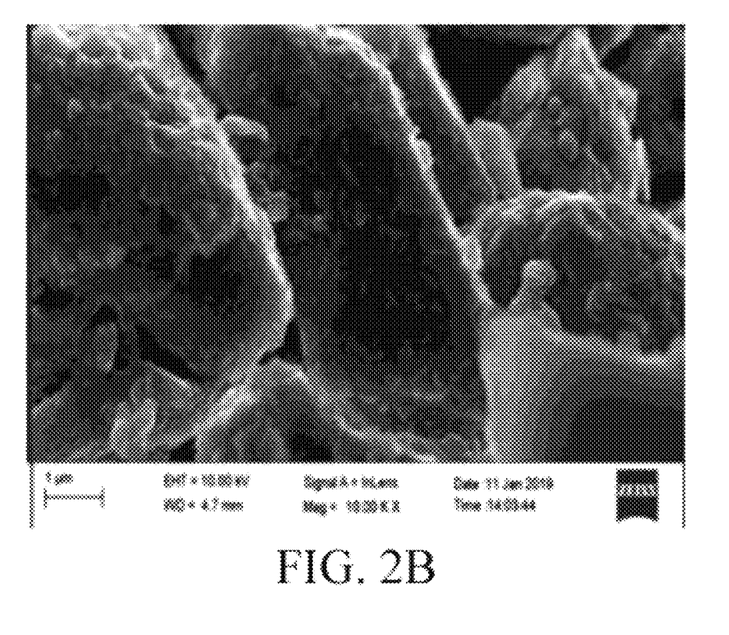
FIG. 2B shows a SEM image of the surface of an anode material of Comparative Example 2 of the present application.
Figure 2C:
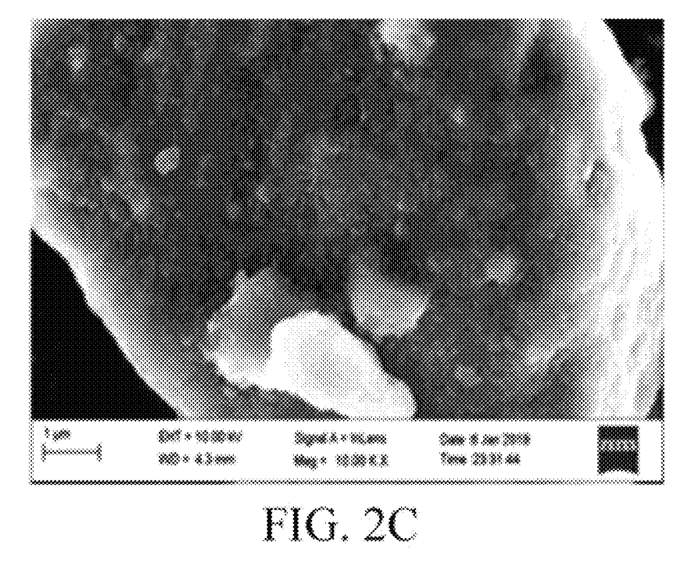
FIG. 2C shows a SEM image of the surface of an anode material of Embodiment 12 of the present application.
Figure 2D:
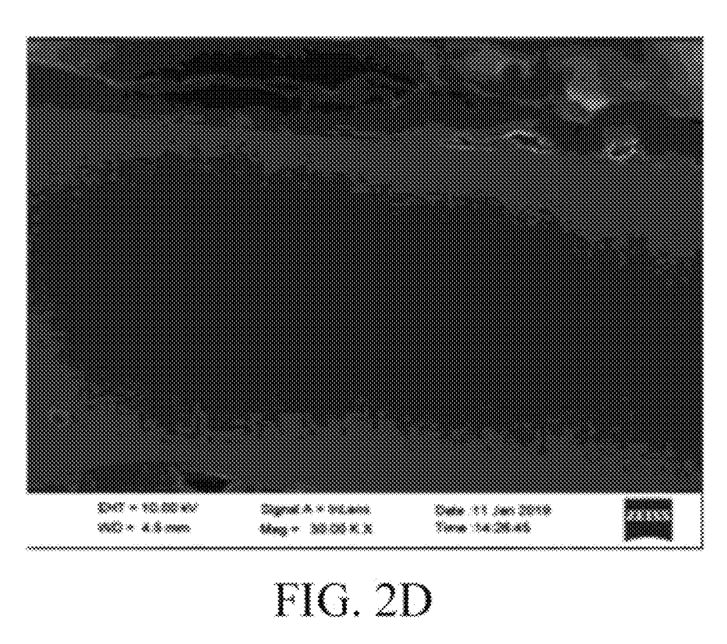
FIG. 2D shows a SEM image of the cross section of the anode material of Embodiment 12 of the present application.

FIG. 2A is a scanning electron microscope (SEM) image of the surface of the anode material of Comparative Example 3 of the present application; FIG. 2B is a SEM image of the surface of the anode material of Comparative Example 2 of the present application; FIG. 2C is a SEM image of the surface of the anode material of Embodiment 12 of the present application; and FIG. 2D is a SEM image of the cross section of the anode material of Embodiment 12 of the present application.

As can be seen from FIG. 2B, the surface of the anode material of Comparative Example 2 had an inorganic coating layer. As can be seen from FIG. 2C, the surface of the anode material of Embodiment 12 had a polymer coating layer. As can be seen from FIG. 2D, the anode material of Embodiment 12 had a double-coating surface structure, that is, the pre-lithiated silicon oxide material was simultaneously coated with the inorganic coating layer and the polymer coating layer.

It can be seen from the test results of Comparative Example 3 that in the absence of the inorganic coating layer and the polymer coating layer, aqueous slurries prepared from the pre-lithiated silicon oxide materials generated heavy settlement, severe gelation, and a high amount of severe gas.

It can be seen from the test results of Comparative Example 2 that aqueous slurries prepared from the pre-lithiated silicon oxide materials having the inorganic coating layer generated slight settlement, slight gelation, and a high amount of gas. The above results demonstrate that the inorganic coating layer can improve water resistance stability of the pre-lithiated silicon oxide material.

It can be seen from the test results of Comparative Example 1 that aqueous slurries prepared from the pre-lithiated silicon oxide materials having the polymer coating layer generated slight settlement, slight gelation, and a high amount of gas. The above results demonstrate that the polymer coating layer can improve water resistance stability of the pre-lithiated silicon oxide material.

Figure 3A:
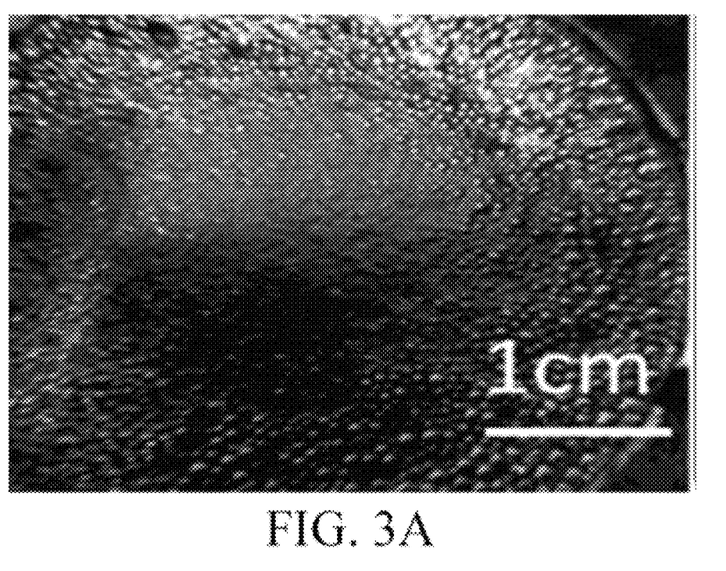
FIG. 3A shows the appearance of an aqueous slurry prepared from the anode material of Comparative Example 3 of the present application after standing for 48 hours.
Figure 3B:
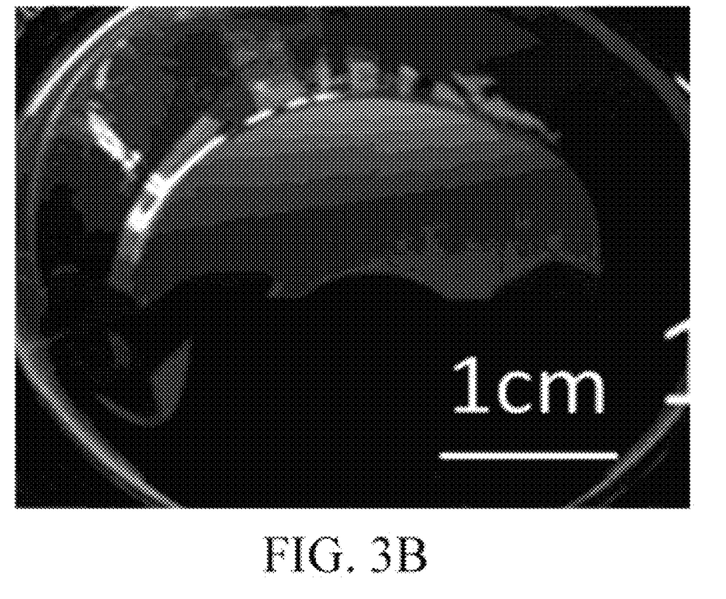
FIG. 3B shows the appearance of an aqueous slurry prepared from the anode material of Embodiment 12 of the present application after standing for 48 hours.

Compared with Comparative Examples 1 to 3, coating the surface of the pre-lithiated silicon oxide material in Embodiments 1 to 18 with the inorganic coating layer and the polymer coating layer can significantly improve the degree of settlement and gelation and/or gas production of the aqueous slurry of the pre-lithiated silicon oxide material. As shown in FIG. 3A, the aqueous slurry prepared from the anode active material of Comparative Example 3 generated heavy settlement and severe gelation. As shown in FIG. 3B, the aqueous slurry prepared from the anode active material of Embodiment 12 generated no settlement or gelation.

Figure 4:
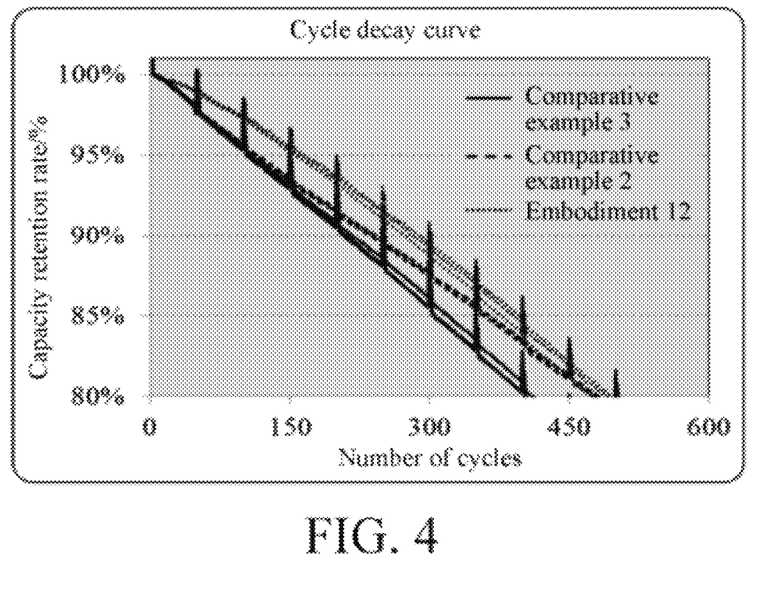
FIG. 4 shows cycle decay curves of lithium ion batteries of Comparative Example 2, Comparative Example 3, and Embodiment 12 of the present application, respectively.

FIG. 4 shows cycle decay curves of the lithium ion batteries of Comparative Example 2, Comparative Example 3, and Embodiment 12 of the present application, respectively. The three cycle decay curves of Embodiment 12 were obtained by testing three lithium ion batteries prepared according to Embodiment 12 under the same test conditions. The two cycle decay curves of Comparative Example 2 were obtained by testing two lithium ion batteries prepared according to Comparative Example 2 under the same test conditions. The two cycle decay curves of Comparative Example 3 were obtained by testing two lithium ion batteries prepared according to Comparative Example 3 under the same test conditions. As shown in FIG. 4, coating the surface of the pre-lithiated silicon oxide material with the inorganic coating layer and the polymer coating layer can significantly improve cycle stability of the anode material.

It can be seen from the test results of Embodiments 10 to 12 that as the amount of the inorganic coating material increases, gas production of the aqueous slurry prepared from the anode material was significantly reduced. The above results show that increasing the content of the inorganic coating layer is beneficial to the improvement of the water resistance stability of the anode material.

It can be seen from the test results of Embodiments 12, 17 and 18 that as the polymer content increases, gelation and gas production of the aqueous slurry prepared from the anode material was remarkably reduced. The above results show that increasing the polymer content is beneficial to the improvement of the water resistance stability of the anode material.

References throughout the specification to "some embodiments," "partial embodiments," "one embodiment," "another example," "example," "specific example" or "partial examples" mean that at least one embodiment or example of the application includes specific features, structures, materials or characteristics described in the embodiments or examples. Thus, the descriptions appear throughout the specification, such as "in some embodiments," "in an embodiment," "in one embodiment," "in another example," "in an example," "in a particular example" or "for example," are not necessarily the same embodiment or example in the application. Furthermore, the specific features, structures, materials or characteristics in the descriptions can be combined in any suitable manner in one or more embodiments or examples.

Although the illustrative embodiments have been shown and described, it should be understood by those skilled in the art that the above embodiments cannot be interpreted as limitations to the present application, and the embodiments can be changed, substituted and modified without departing from the spirit, principle and scope of the present application.

What is claimed is:

1. An anode material, comprising: a lithiated silicon oxide material, an inorganic coating layer, and a polymer coating layer; wherein the inorganic coating layer and the lithiated silicon oxide material at least have a layer of Si—O-M bonds therebetween, and M comprises at least one selected from the group consisting of an aluminum element, a boron element, and a phosphorus element.

2. The anode material according to claim 1, wherein the lithiated silicon oxide material comprises at least one selected from the group consisting of $Li_2SiO_3$, $Li_6Si_2O_7$, $Li_2Si_2O_3$ and $Li_4SiO_4$.

3. The anode material according to claim 1, wherein the inorganic coating layer comprises a compound containing at least one selected from the group consisting of a phosphorus element, an aluminum element, and a boron element.

4. The anode material according to claim 1, wherein a weight percentage of M is 0.05 wt % to 1.0 wt %, based on a total weight of the anode material.

5. The anode material according to claim 1, wherein the anode active material has an X-ray diffraction peak having a $2\theta$ value of $21.7\pm1°$.

6. The anode material according to claim 1, wherein the polymer coating layer comprises a hydrophobic polymer.

7. The anode material according to claim 1, wherein the polymer coating layer comprises at least one of the following compounds: polyimide, polyamideimide, polysiloxane, styrene butadiene rubber, epoxy resin, polyester resin and polyurethane resin.

8. The anode material according to claim 1, wherein a weight percentage of the polymer coating layer is 0.1 wt % to 10 wt %, based on the total weight of the anode material.

9. The anode material according to claim 1, wherein a thickness of the polymer coating layer is 5 nm to 200 nm.

10. The anode material according to claim 1, wherein the lithiated silicon oxide material comprises nano silicon crystal grains having a grain size of not more than 10 nm.

11. An anode, comprising a substrate and an anode material, the anode material comprises a lithiated silicon oxide material, an inorganic coating layer, and a polymer coating layer, wherein the inorganic coating layer and the lithiated silicon oxide material at least have a layer of Si—O-M bonds therebetween, and M comprises at least one selected from a group consisting of an aluminum element, a boron element, and a phosphorus element.

12. The anode according to claim 11, wherein the lithiated silicon oxide material comprises at least one of $Li_2SiO_3$, $Li_6Si_2O_7$, $Li_2Si_2O_3$ and $Li_4SiO_4$.

13. The anode according to claim 11, wherein the inorganic coating layer comprises a compound containing at least one of a phosphorus element, an aluminum element, and a boron element.

14. The anode according to claim 11, wherein a weight percentage of M is 0.05 wt % to 1.0 wt %, based on the total weight of the anode material.

15. The anode according to claim 11, wherein a thickness of the polymer coating layer is 5 nm to 200 nm.

16. The anode according to claim 11, wherein the lithiated silicon oxide material comprises nano silicon crystal grains having a grain size of not more than 10 nm.

17. An electrochemical device, comprising the anode according to claim 11.

18. An electronic device, comprising an electrochemical device according to claim 17.

* * * * *